_United States Patent_ [19]

Frye et al.

[11] 4,061,480

[45] Dec. 6, 1977

[54] VACUUM CLEANER FOR RADIOACTIVELY CONTAMINATED PARTICLES

[75] Inventors: Burton L. Frye, Napa, Calif.; Max G. Pittman, Kahlotus, Wash.; David A. Runge; Lawrence C. Souza, both of Petaluma, Calif.; Raymond V. LaVoie, Sonoma, Calif.

[73] Assignee: The United States of America as represented by the Secretary of the Navy, Washington, D.C.

[21] Appl. No.: 688,456

[22] Filed: May 20, 1976

[51] Int. Cl.² ............................................. B01D 50/00
[52] U.S. Cl. ....................................... 55/356; 55/362; 55/364; 55/366; 55/372; 55/376; 55/429; 55/485; 55/502; 55/DIG. 2; 55/DIG. 3; 55/DIG. 9; 55/DIG. 26; 252/301.1 W; 252/301.15
[58] Field of Search ................. 55/364, 366, 369, 370, 55/374, 376, 379, 429, 482, 485, 493, 502, DIG. 2, DIG. 3, DIG. 9, DIG. 26, 356, 362, 372; 252/301.1 W, 301.15; 15/347, 352

[56] References Cited

U.S. PATENT DOCUMENTS

| | | | |
|---|---|---|---|
| 2,721,625 | 10/1955 | Lagerstrom | 55/DIG. 3 |
| 3,127,629 | 4/1964 | Miller, Jr. | 55/DIG. 3 |
| 3,343,344 | 9/1967 | Fairaizl et al. | 55/429 |
| 3,636,681 | 1/1972 | Batson et al. | 55/482 |
| 3,706,184 | 12/1972 | Tucker | 55/482 |
| 3,957,469 | 5/1976 | Nebash | 55/270 |
| 3,961,921 | 6/1976 | Hult et al. | 55/364 |
| 3,966,439 | 6/1976 | Lysander Vennos | 55/270 |

FOREIGN PATENT DOCUMENTS

| | | | |
|---|---|---|---|
| 65,118 | 8/1942 | Norway | 55/485 |

OTHER PUBLICATIONS

The Amazing Story of the Absolute ® Filter, Cambridge Filter Corporation, Syracuse, New York, Bulletin 104, copyright 1963, pp. 1–5, 9.

Primary Examiner—Frank W. Lutter
Assistant Examiner—David L. Lacey
Attorney, Agent, or Firm—R. S. Sciascia; Charles D. B. Curry; James M. Skorich

[57] ABSTRACT

An apparatus which uses suction to draw radioactive particles through a high efficiency filter and contains such filtered particles in a disposable bladder-filter unit for subsequent disposal. The bladder-filter unit prevents the escape of filtered radioactive particles to the ambient atmosphere during the operation of the apparatus and also during disposal, as well as preventing the radioactive contamination of the remainder of the apparatus.

9 Claims, 2 Drawing Figures

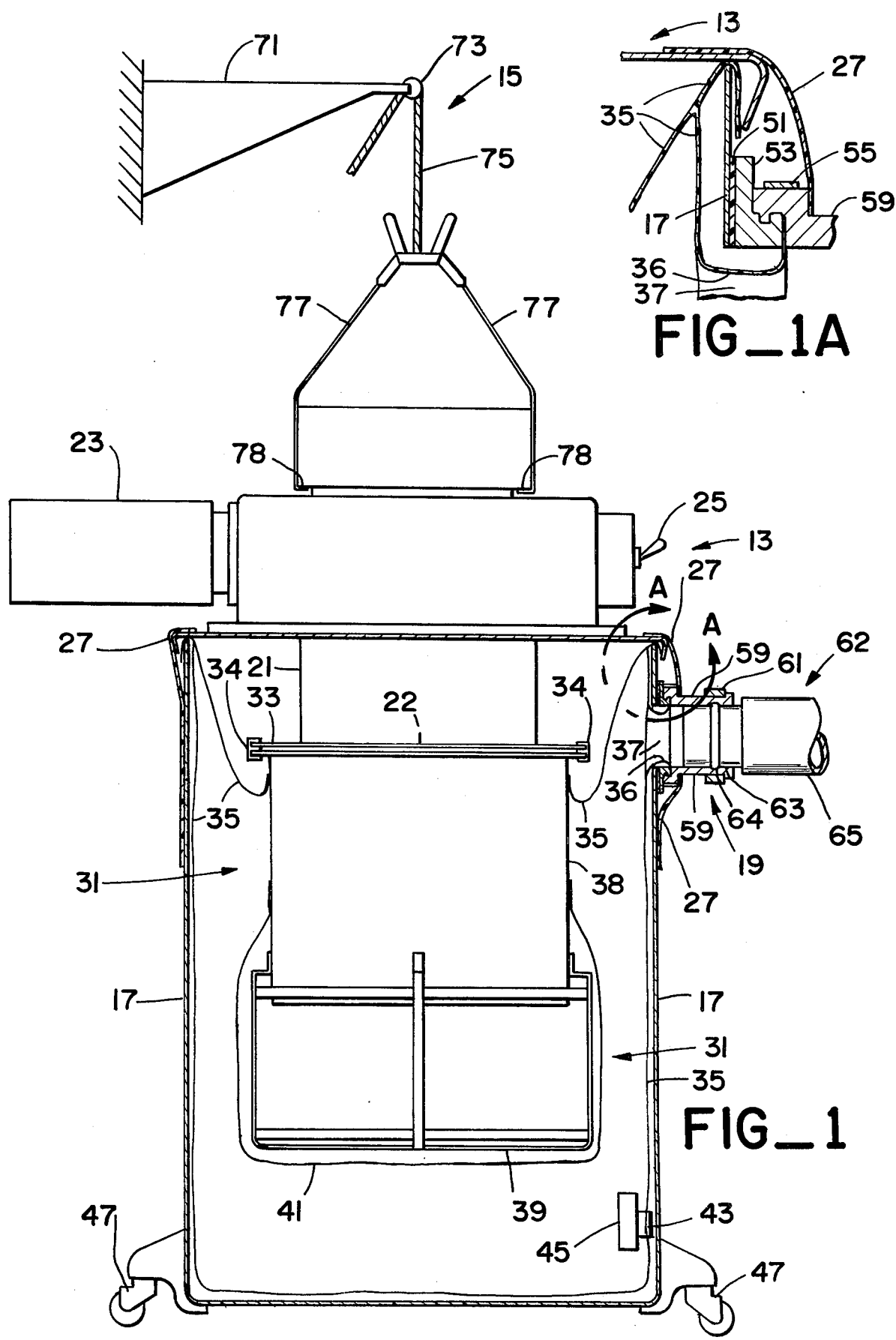

VACUUM CLEANER FOR RADIOACTIVELY CONTAMINATED PARTICLES

BACKGROUND OF THE INVENTION

1. Field of the Invention

The present invention relates to the field of filtering radioactive particles from the ambient air and sealably containing such filtered particles, and more particularly, filtering accomplished by a suction means located downstream of a high efficiency filter and the containment of filtered radioactive particles in a removable, disposable bladder-filter unit.

2. Description of the Prior Art

The radioactivity of an object may be due to "fixed" contamination or "loose" contamination. While the former cannot be easily removed, the latter is often due to radioactively contaminated dust or particulate matter and decontamination may be accomplished simply by the removal of such particles from the surface of the object. Such is presently accomplished by using conventional vacuum cleaners.

There are several significant problems inherent in such a practice. The vacuum cleaner itself becomes contaminated, and must be taken apart and cleaned after every usage. Such cleaning generates radioactive waste that requires expensive disposal by burial. Furthermore, even aftr being cleaned, the vacuum cleaner must still be regarded as radioactively contaminated and therefore requires storage in a "control" area with other radioactively contaminated items. Such items must be checked in and out, and constantly accounted for. Personnel using contaminated vacuum cleaners must wear protective gear, and even then are exposed to radioactivity.

The procedure for disposing of the radioactive particles contained in the vacuum cleaner's waste bag is very time consuming because the bag must be tightly sealed prior to its removal from the vacuum cleaner to prevent the escape of radioactive particles into the ambient atmosphere. Typically, this procedure requires two men 3 hours to complete, i.e., 6 man-hours, and these men, although wearing protective clothing, are nonetheless subjected to radioactivity throughout this interval.

As conventional vacuum cleaners sometimes leak vacuumed particles into the ambient air during their operation, the hazard of radioactive exposure for all personnel in the working area is increased.

Should the vacuum cleaner become obsolete or mechanically inoperative, it would require disposal by burial.

The present invention provides an apparatus which effectively vacuums up and retains radioactive particles, does not leak such particles into the ambient atmosphere during its operation, and provides for quick and safe removal of filtered, contained particles (the disposal procedure requires approximately one-third of a man-hour). Furthrmore, as no part of the apparatus other than the bladder-filter unit which contains the filtered radioactive particles comes into contact with such particles, the remainder of the apparatus need not be cleaned after every usage nor stored in a "control" area, and will not require disposal by burial in the event it becomes mechanically inoperative or obsolete.

SUMMARY OF THE INVENTION

Briefly, the present invention is an apparatus which uses a suction means to draw radioactive particles through a high efficiency filter and retains filtered particles in a disposable filter-bladder unit for subsequent disposal.

The bladder-filter unit prevents filtered particles from escaping into the ambient atmosphere during the operation of the suction means and also during its removal from the apparatus, in addition to preventing such particles from contaminating the remainder of the apparatus.

STATEMENT OF THE OBJECTS OF THE INVENTION

It is an object of the present invention to gather and retain radioactive particles. Another object is to prevent the dispersal of radioactive particles into the ambient atmosphere during their gathering.

A further object is to retain gathered radioactive particles in a disposable container which permits their quick and easy removal from the present invention.

Yet another object is to prevent the escape of gathered radioactive particles into the ambient atmosphere when they are removed from the present invention for disposal.

Still another object is to prevent the parts of the present invention other than the interior surface of a disposable container unit from coming into contact with gathered radioactive particles.

Another object is to provide an apparatus for gathering and retaining radioactive particles which need not be cleaned to remove any radioactive particles after every usage nor stored in a radioactive "control" area between usages.

Still another object is to provide an apparatus for gathering and retaining radioactive particles which will not require disposal by burial in the event it becomes mechanically inoperative or obsolete.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a cross-sectional view illustrating the preferred embodiment of the present invention; and FIG. 1A is an enlargement of section A—A of FIG. 1.

DESCRIPTION OF THE PREFERRED EMBODIMENT

Referring particularly to FIG. 1, the preferred embodiment of the present invention is comprised of head section 13, head section removal apparatus 15, cylindrical housing 17, and intake assembly 19.

A conventional suction generator including a motor and a fan (not shown) is located inside casing 21 which is fixedly attached to the interior surface of head section 13. Casing 21 has circular opening 22 located in its bottom surface. Also located in head section 13 are suction generator exhaust diffuser 23 and suction generator actuator switch 25.

Head section 13 is operatively positioned on top of cylindrical housing 17. This positioning is sealably and fixedly maintained by wrapping tubing 27 annularly about the interface between the two sections and then directing a stream of heated air onto tubing 27. Tubing 27 is a commercially available material which shrinks when heated and retains its shrunken configuration after it has cooled to room temperature.

Cylindrical housing 17 contains filter unit 31, adapter plate 33, barrel clamp 34, bladder 35, intake port 37, and the protruding lower part of casing 21. Adapter plate 33 is circular and has a circular opening through its center having about the same diameter as opening 22. Adapter plate 33 is fixedly attached to the bottom surface of casing 21 such that its opening lines up with opening 22.

Filter unit 31 is comprised of cartridge 38, shield 39, and bag 41. Cartridge 38 is a cylinder open at both ends and contains material which captures and otherwise prevents solid particles having a diameter equal to or greater than 0.3 microns from passing through the length of cartridge 38 about 99.95% of the time. Cartridge 38 and, hence, filter unit 31, are removably attached to adapter plate 33 by means of annular barrel clamp 34. Cartridge 38 communicates with the suction generator through the opening in adapter plate 33 and opening v2 in casing 21.

Bag 41 permits the passage of air but not solid particles of a relatively large size, i.e., it does not have the capability to filter particles as small as those which cartridge 38 can filter. It is attached annularly about the rigid side of cartridge 38; such positioning allows it to function as a preliminary filter for cartridge 38, and thereby increases the operational life of cartridge 38.

Shield 39 is a metal frame annularly attached to the side of cartridge 38 at its bottom end. Shield 39 is designed to provide bag 41 with a greater area of exposure than would otherwise be the case, and to allow its functional area to remain unaffected when the suction generator is in operation. Without shield 39, the suction generator would draw bag 41 across the bottom opening of cartridge 38, thereby reducing its exposed area and tending to clog the opening.

Bladder 35 is an integral piece of flexible material that is impermeable to air. It is fixedly attached annularly about the rigid side of cartridge 38 and also folded and removably positioned in-between the upper rim of cylindrical housing 17 and the bottom of head section 13.

Bladder 35 includes port opening 36 which is tubular and operatively positioned to lie concentrically within intake port 37 in cylindrical housing 17. Such positioning allows the volume enclosed by bladder 35 to communicate with the ambient atmosphere. As shown in FIG. 1A, the edges of opening 36 are removably tucked in-between elements of intake asembly 19, as will hereinafter be discussed in detail, in order to securely position it.

Bladder 35 also includes pressure relief opening 43. Opening 43 prevents bladder 35 from being drawn up against bag 41 during the operation of the suction generator by reducing the pressure differential between the volume enclosed by bladdder 35 and the volume contained in-between bladder 35 and the inner surface of cylindrical housing 17. Fixedly inserted into opening 43 is filter 45. Filter 45 allows air to pass through, but prevents the passage of particulate matter.

Casters 47 are fixedly attached to the exterior of cylindrical housing 17 near its bottom to allow the vacuum cleaner to be easily rolled from one location to another.

Intake assembly 19 is located outside of cylindrical housing 17 adjoining intake port 37 and port opening 36 in bladder 35. It is essentially an adapter which allows intake hose 62 to be securely but removably attached to intake port 37, and also allows hose 62 to sealably communicate with bladder 35 through opening 36. Assembly 19 includes gasket 51, fitting 53, clamp 55, hose adapter 59, and slip ring 61.

Gasket 51 is circular with an opening in its middle which is larger than port 37. It is operationally positioned in-between fitting 53 and the side of cylindrical housing 17 and circumscribes port 37. Fitting 53 also circumscribes port 37 and is fixedly attached to gasket 51. Fitting 53 has a protruding lip which is notched to operatively accommodate abutting hose adapter 59.

Hose adapter 59 is tubular and preferably made of rubber. It is operatively held in the aforementioned notch of fitting 53 by the tightening of annular clamp 55, and thereby prevented from moving laterally or axially with respect to port 37.

Tubular opening 36 in bladder 35 is located concentrically within port 37 to prevent any interior surface of cylindrical housing 17 from coming into contact with suctioned radioactive particles. It is removably but securely positioned therein by placing the end of the tubular opening 36 of bladder 35 in-between fitting 53 and adapter 59 prior to the tightening of clamp 55.

Intake hose 62 includes coupling 63, tubing 65, and an attachment (not shown). Coupling 63 is tubular and is fixedly attached to the left end of tubing 65; the attachment is removably attached to the right end. The attachment is a typical vacuum cleaner accessory designed to facilitate the gathering of particles by increasing the surface area which communicates with the suction generator.

Coupling 63 communicates with tubing 65 and opening 36 of bladder 35. Its purpose is to securely and sealably, but removably, attach tubing 65 to opening 36. Coupling 63 has an outside diameter slightly less than the inside diameter of hose adapter 59, and is operably positioned therein. Coupling 63 includes annular ridge 64 formed about its circumference. Coupling 63 is restrained from sliding out of adaptor 59 by the positioning of tight fitting slip ring 61 about the circumference of adapter 59 in the plane of annular ridge 64.

In operation, the preferred embodiment of the present invention draws particles through intake hose 62 and into bladder 35 by means of the negative pressure created by the suction generator. Relatively large particles are then filtered out of the airstream by bag 41 and are subsequently contained within bladder 35. Smaller particles, i.e., particles having a diameter equal to or greater than 0.3 microns, are filtered out further downstream by the filter material located within cartridge 38 and subsequently contained by bag 41 or bladder 35. As bladder 35 prevents ambient air or filtered particles from entering head section 13, and as head section 13 is situated downstream of bag 41 and cartridge 38, only filtered air passes through section 13 and the suction generator contained therein, whereupon it is exhausted into the ambient atmosphere through exhaust diffuser 23.

Head section removal apparatus 15 includes bracket 71, pulley wheel 73, rope 75, and flanges 77. Bracket 71 is rigidly attached to a wall and pulley wheel 73 is rotatably located at its end. Rope 75 passes about wheel 73 and is fixedly attached to the top end of flanges 77. A tensile force is operatively applied at the other end of rope 75 by a winch or person (not shown). The ends of flanges 77 are curved to removably hook under overhanging horizontal surface 78 of head section 13.

The disposal of the particles gathered by the vacuum cleaner is initiated by the removal of intake hose 62 from intake port 37. Such is accomplished by the removal of slip ring 61 followed by the withdrawal of coupling 63 from hose adapter 59. Intake hose 62, contaminated by being exposed to radioactive particles, is stored in a control area or disposed of by burial. Tubing 27 is then severed with a conventional cutting device and removed. Clamp 55 is then removed to allow the removal of hose adapter 59. This frees the ends of port opening 36 otherwise held in-between adapter 59 and fitting 53. Opening 36 is then sealed.

The curved ends of flanges 77 are hooked under overhanging surface 78 of head section 13, and sufficient tensile force is applied to the end of rope that is not attached to flanges 77 to lift head section 13 off of the top of cylindrical housing 17. This frees the folded section of bladder 35 that is operatively positioned in-between the periphery of the bottom of head section 13 and the top of cylindrical housing 17.

Barrel clamp 34 is then removed to permit the removal of adapter plate 33 from the top of cartridge 38, thereby disengaging filter unit 31 from casing 21 and head section 13.

The unit consisting of filter unit 31 and bladder 35 is then lifted out of cylindrical housing 17 for ultimate disposal by burial. As no part of head section 13 or cylindrical housing 17 comes into contact with the suctioned particles either during the operation of the suction generator or the disposal process, the vacuum cleaner is immediately available for subsequent use upon the installation of a new bladder 35 and filter unit 31 and the attachment of intake hose 62. The device need not be stored in a radioactive control area between usages.

It should be noted that, due to the radioactive nature of the particulate matter that is filtered and contained by the vacuum cleaner, prudent safety considerations require that it be determined prior to use that the vacuum cleaner has not been tampered with. This is because tampering could accidently rupture bladder 35 or othrwise allow radioactive particles suctioned into cylindrical housing 17 to escape into the ambient atmosphere, head section 13, or the volume contained in-between the interior surface of cylindrical housing 17 and bladder 35. The use of tubing 27 as described hereinbefore allows personnel to quickly and reliably ascertain whether any tampering has occurred by visually inspecting the integrity of tubing 27.

What is claimed is:

1. A vacuum cleaner for removing radioactive particles from the surface of an object comprising:
   a. an upper housing having an exhaust port;
   b. a lower housing having an input port;
   c. means for sealably connecting said upper housing to said lower housing in an airtight manner;
   d. a suction means, having an intake opening and an exhaust opening connected to said exhaust port, for creating a local pressure differential, said suction means being fixedly contained in said upper housing;
   e. a filter container having two openings and containing a material capable of filtering very fine particles, one opening of said container being removably attached to said intake opening of said suction means;
   f. a retainer of a flexible material located in said lower housing, said retainer having a central opening, a fold concentric with said central opening, and a port opening, said central opening being attached annularly to the side of said filter container in an airtight manner such that the second opening of said filter container is enclosed by said retainer, said port opening being removably attached in an airtight manner peripherally to said input port of said lower housing, and said fold being peripherally held by the interface of said upper and said lower housings;
   whereby ambient air containing radioactive particles enters said retainer through said port opening and is filtered by said filter container so that the radioactive particles are retained in said retainer without contaminating said vacuum cleaner.

2. A vacuum cleaner as recited in claim 1 further comprising:
   a. a frame attached to the second opening of said filter container; and
   b. a filter bag having an opening attached annularly to the side of said filter container in an airtight manner which encloses said frame and said second opening;
   whereby ambient air carrying radioactive particles is filtered in sequence by said filter bag and said filter container.

3. A vacuum cleaner as recited in claim 2 further comprising:
   a. said retainer having a vent opening to said lower housing; and
   b. a filter positioned within said vent opening;
   whereby the pressure within said retainer is equalized to the pressure outside said retainer and inside said lower housing to prevent collapse of said retainer.

4. A vacuum cleaner as recited in claim 3 further comprising means for removing said upper housing from said lower housing so that said retainer with entrapped radioactive particles can be removed and replaced.

5. A vacuum cleaner as recited in claim 4 wherein said filter material of said container is capable of filtering smaller particles than said filter bag is capable of filtering.

6. A vacuum cleaner as recited in claim 5 wherein said filter material of said container is capable of filtering particles as small as 0.3 microns in diameter.

7. A vacuum cleaner as recited in claim 6 wherein said filter container is a cylinder with said openings at the opposing ends of said cylinder.

8. A vacuum cleaner as recited in claim 7 wherein said sealably connecting means comprises a heat shrinkable tubing shrunk about the exterior periphery of the interface between said upper and said lower housings.

9. A vacuum cleaner as recited in claim 8 wherein said removing means comprises:
   a. a flange having curved ends which hook under an overhanging surface of said upper housing; and
   b. means for exerting a vertical force to said flange to lift said upper housing from said lower housing after said heat shrinkable tubing is removed.

* * * * *